US008351918B2

(12) United States Patent
Takami

(10) Patent No.: US 8,351,918 B2
(45) Date of Patent: Jan. 8, 2013

(54) MOBILE TERMINAL FOR PERFORMING DATA COMMUNICATION IN A DATA COMMUNICATION RANGE

(75) Inventor: Katsunori Takami, Hamura (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 485 days.

(21) Appl. No.: 12/651,513

(22) Filed: Jan. 4, 2010

(65) Prior Publication Data

US 2010/0173623 A1 Jul. 8, 2010

(30) Foreign Application Priority Data

Jan. 8, 2009 (JP) ................ P2009-002756

(51) Int. Cl.
*H04W 4/00* (2009.01)
*H04W 88/02* (2009.01)
(52) U.S. Cl. ............... 455/421; 455/452.1; 370/328; 370/401
(58) Field of Classification Search .............. 455/421, 455/452.1; 370/318, 343, 328, 401
See application file for complete search history.

(56) References Cited

U.S. PATENT DOCUMENTS

| 6,885,920 | B2 * | 4/2005 | Yakes et al. | 701/22 |
| 7,173,938 | B1 * | 2/2007 | Davidow | 370/401 |
| 8,194,584 | B2 * | 6/2012 | Nakatsugawa | 370/318 |
| 2003/0158638 | A1 * | 8/2003 | Yakes et al. | 701/22 |
| 2007/0171921 | A1 * | 7/2007 | Wookey et al. | 370/401 |
| 2007/0179955 | A1 * | 8/2007 | Croft et al. | 707/9 |
| 2007/0192329 | A1 * | 8/2007 | Croft et al. | 707/10 |
| 2008/0172417 | A1 * | 7/2008 | Oehler et al. | 707/104.1 |
| 2009/0323663 | A1 * | 12/2009 | Nakatsugawa | 370/343 |
| 2010/0173623 | A1 * | 7/2010 | Takami | 455/421 |
| 2011/0237272 | A1 * | 9/2011 | Gorokhov et al. | 455/452.1 |
| 2012/0002605 | A1 * | 1/2012 | Yoshino et al. | 370/328 |
| 2012/0109407 | A1 * | 5/2012 | Yousefi et al. | 701/1 |

FOREIGN PATENT DOCUMENTS

JP 2007-181178 A 7/2007

* cited by examiner

*Primary Examiner* — William D Cumming
(74) *Attorney, Agent, or Firm* — Maschoff Gilmore & Israelsen

(57) ABSTRACT

A mobile terminal includes a first communication module, a second communication module, a state management module configured to make an out-of-range notification when a communication state of the first communication module moves out of a communication range, a notification module configured to send a user notification as a notification indicating that the first communication module is disconnected to a user when the out-of-range notification is received, a determination module configured to determine whether or not a given process for the user notification is completed, a setting module configured to perform setting indicating that the process for the user notification is completed to the state management module when the determination module determines that the process is completed, and a communication prohibition module for prohibiting the data communication by the second communication module until the setting indicating that the process is completed is performed after the communication state of the first communication module moves out of the communication range.

12 Claims, 10 Drawing Sheets

FIG. 1A
FIG. 1B
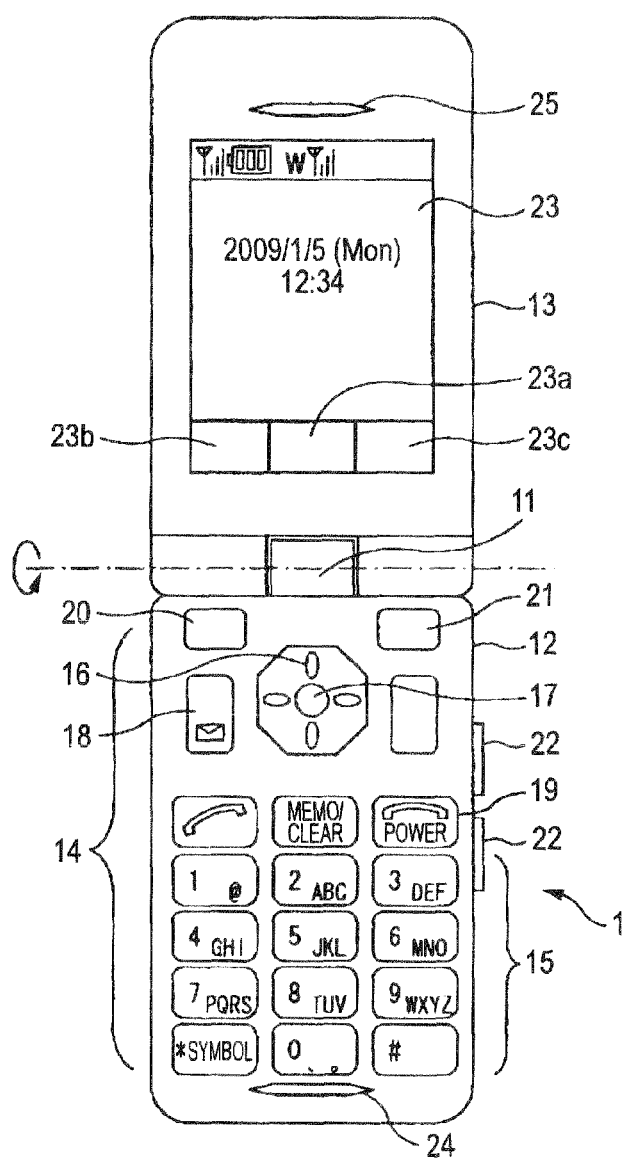
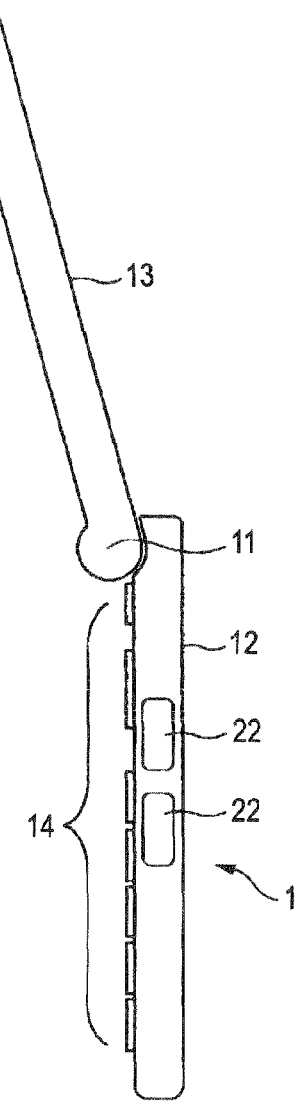

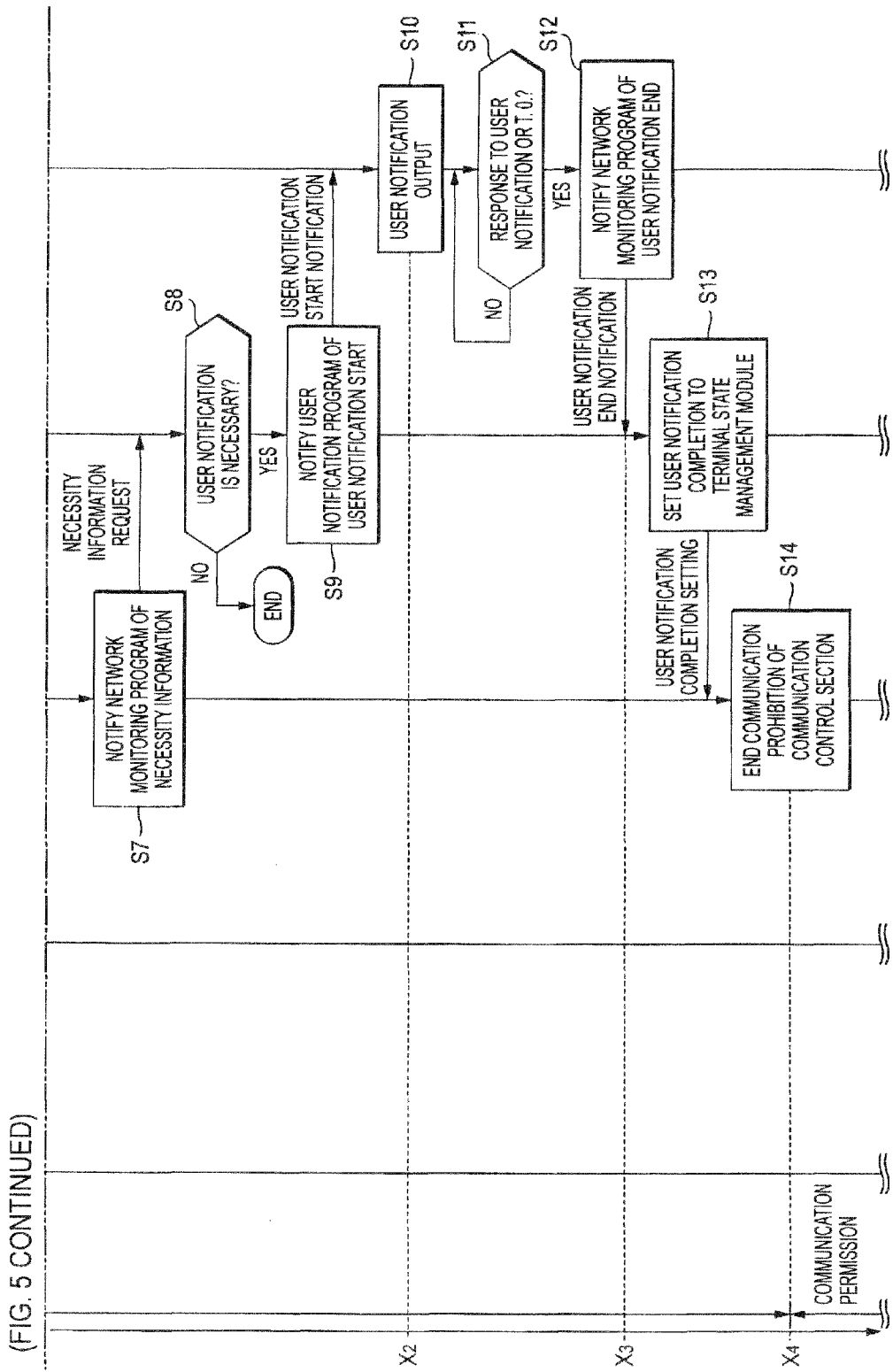

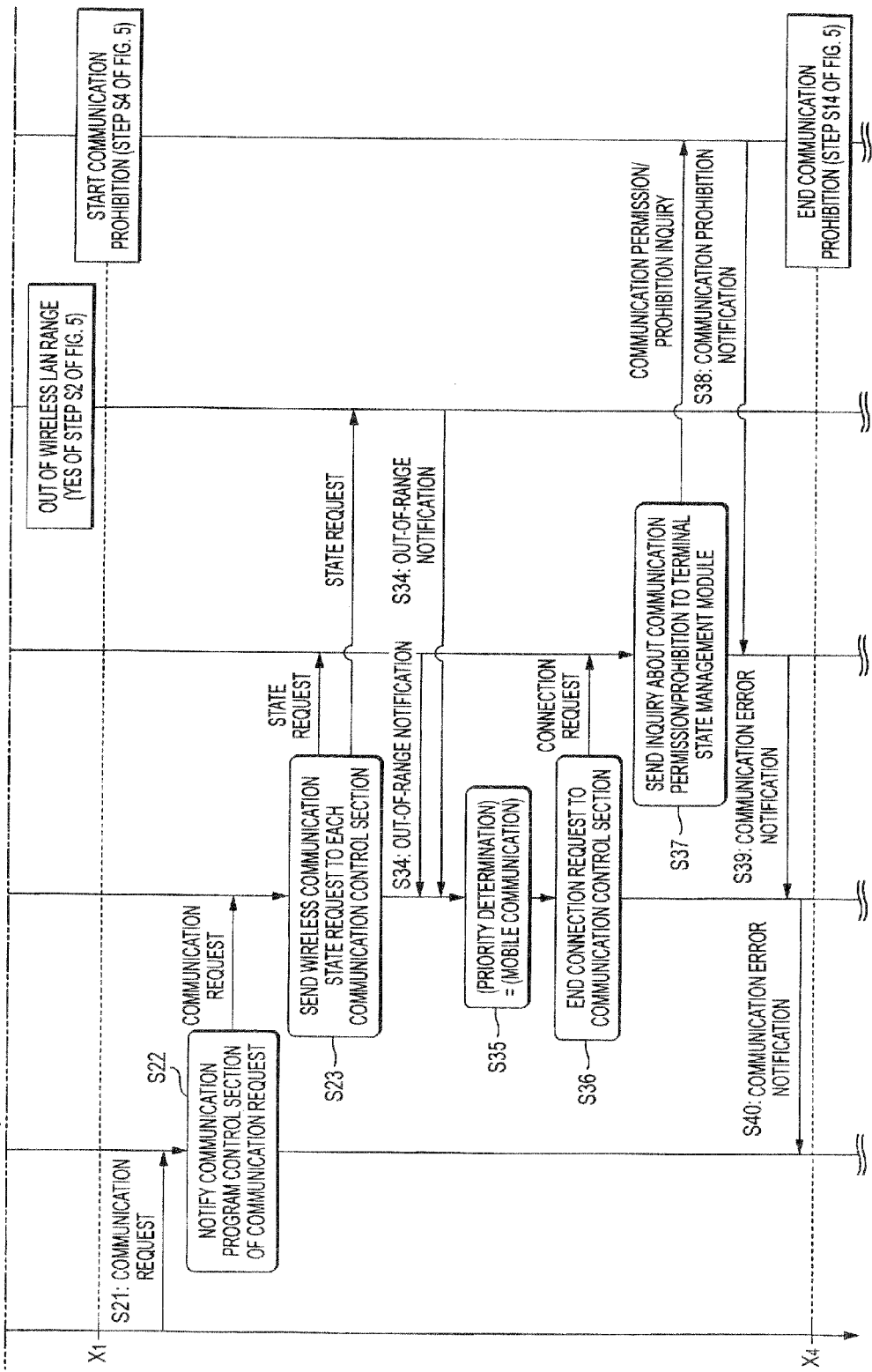

MOBILE TERMINAL FOR PERFORMING DATA COMMUNICATION IN A DATA COMMUNICATION RANGE

CROSS-REFERENCE TO RELATED APPLICATIONS

The present application is based on Japanese Patent Application No. 2009-002756 filed on Jan. 8, 2009, and the contents thereof are incorporated herein by reference.

BACKGROUND

1. Field of the Invention

The present invention relates to a mobile terminal having a function of performing data communication by a plurality of communication systems, such as a mobile terminal which appropriately switches the communication systems.

2. Description of Related Art

At present, a mobile terminal such as a cellular phone has data communication functions such as mail transmission/reception functions or web page access functions in addition to voice communication functions as its basic function.

When data communication is performed by a mobile terminal, the data communication performed via a mobile communication system using a public line network (for example, Code Division Multiple Access (CDMA) or Global System for Mobile Communications (GSM)). On the other hand, there are mobile terminals to which a communication function using a wireless Local Area Network (LAN) is further added.

In a mobile terminal capable of employing a plurality of communication systems such as mobile communication and wireless LAN communication, how to select the communication system using data communication is important. For example, JP-A-2007-181178 discloses a mobile communication terminal having a wireless LAN connection function which reduces power consumption by appropriately selecting the communication system.

When a plurality of available communication systems (within a communication range) exists for a mobile terminal, the communication system to be preferentially used among the plurality of available communication systems may be preset. For example, switching to another communication system is performed to continue data communication when communication has been generated out of range during the data communication with the preferentially used communication system or is performed for data communication when new data communication has been generated.

Billing systems may differ between different communication systems installed to a mobile terminal. For example, a communication system using mobile communication is generally expensive between a communication system using mobile communication and a communication system using a wireless LAN.

When communication is temporarily generated out of range, as described above, the mobile terminal may be automatically switched from a preferentially used communication system (for example, a low-cost wireless LAN) to another communication system (for example, high-cost mobile communication). As a result, when data communication is continued in a state in which a user does not recognize the switching of the communication system, an unintended data communication cost may be added.

SUMMARY

The present invention provides a mobile terminal which appropriately controls to switch between different communication systems to be used for data communication.

According to an embodiment of the present invention, a mobile terminal includes: a first communication module for performing data communication in a first wireless communication system; a second communication module for performing the data communication with a base station in a second wireless communication system; a state management module for managing a communication state of the first communication module and making an out-of-range notification as a notification indicating that the first communication module moves out of a communication range when communication by the first communication module moves out of the communication range from a state in which both the first communication module and the second communication module are within the communication range; a notification module for sending a user notification as a notification indicating that the first communication module is disconnected to a user when the out-of-range notification is received by the state management module; a determination module for determining whether or not a given process for the user notification is completed; a setting module for performing setting indicating that the process for the user notification is completed to the state management module when the determination module determines that the process is completed; and a communication prohibition module for prohibiting the data communication by the second communication module even when communication by the second communication module is within the communication range until the setting indicating that the process is completed is performed by the setting module after the communication state managed by the state management module is changed from a state in which both the first communication module and the second communication module are within the communication range to a state in which a communication state of the first communication module moves out of the communication range.

BRIEF DESCRIPTION OF THE DRAWINGS

FIGS. 1A and 1B are diagrams showing an external configuration of a folding mobile terminal as an example of a mobile terminal according to the present invention.

DETAILED DESCRIPTION

Figure 2A:
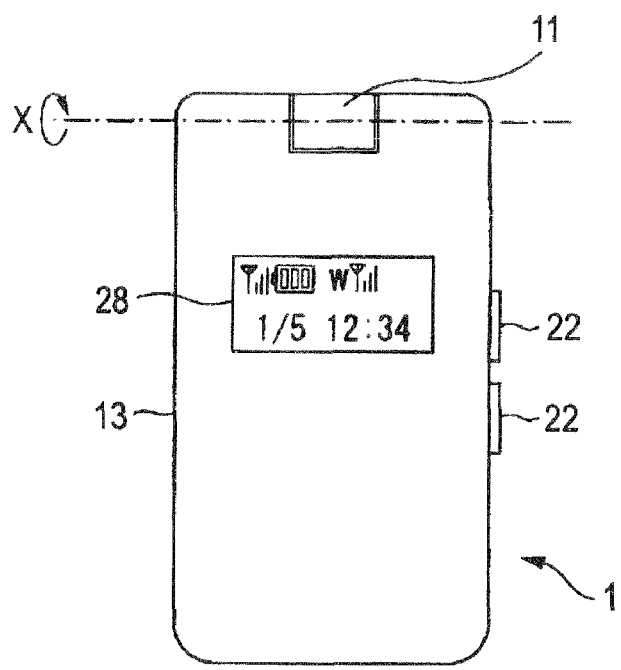
FIGS. 2A and 2B are diagrams showing another external configuration of the folding mobile terminal as the example of the mobile terminal according to the present invention.

FIG. 1A shows an external configuration viewed from the front side in the open state of a cellular phone 1 which is open at about 180 degrees, and FIG. 1B shows an external configuration viewed from the side when the portable phone 1 is open.

As shown in FIGS. 1A and 1B, the cellular phone 1 has a first housing 12 and a second housing 13 hinge-coupled by a center hinge portion 11 at a border therebetween and is formed to be foldable in an arrow X direction via the hinge portion 11. Antennas for transmission/reception (an antenna 38 and a wireless LAN antenna 40 of FIG. 3 to be described later) are installed at given positions inside the cellular phone 1, and transmit/receive radio waves to/from a base station of a mobile communication network (not shown) or a wireless LAN access point (not shown) via the embedded antennas.

Operation keys 14 are installed on a surface of the first housing 12. The operation keys 14 include numeric keys 15 capable of inputting numbers from "0" to "9" or alphabets from "A" to "Z", arrow keys 16 having up, down, left, and right direction keys, an enter key 17, a mail key 18, a power key 19, a left soft key 20, a right soft key 21, and the like.

A user can move a cursor or the like displayed on a main display 23 in the up, down, left, and right directions by operating the arrow keys 16 in the up, down, left, and right directions. A process entered among various processes is executed by pressing the enter key 17. A process displayed on an enter key function display portion 23a arranged in a lower portion of the main display 23 is also assigned to the enter key 17.

Further, the left soft key 20 and the right soft key 21 are arranged above the arrow keys 16 and the enter key 17 of the first housing 12. Side keys 22 which perform an operation of the cellular phone 1 are arranged on a side surface of the first housing 12. In terms of the left soft key 20 and the right soft key 21, a function is switched by an application to be executed. A function to be executed by pressing each key is displayed on a function display portion 23b (corresponding to the left soft key) and a function display portion 23c (corresponding to the right soft key) arranged in a lower portion of the main display 23. The mail key 18 is a key to which a process for displaying a menu screen is assigned while an e-mail function is used. When the e-mail function is used, the user first presses the mail key 18 to perform an operation of opening the menu screen.

A microphone 24 is arranged below the operation keys 14, and collects the voice of the user upon voice communication.

A battery (not shown) is inserted into a backside of the first housing 12. When the power key 19 is pressed and the battery is in an ON state, power is supplied from the battery to each circuit section and the cellular phone 1 is started in an operable state.

On the other hand, the main display 23 is arranged on the second housing 13. Content of an e-mail, content of a homepage, or the like as well as antenna pictograms indicating sensitivity levels of the antennas of the mobile communication network and the wireless LAN communication network and a battery pictogram indicating a currently remaining battery level of the cellular phone 1 is displayed on the main display 23. For example, the main display 23 is a display having a Liquid Crystal Display (LCD), or an organic Electron Luminescence (organic EL) display.

A receiver 25 is arranged at a given position above the main display 23. The receiver 25 enables the user to perform voice communication. A speaker (a speaker 35 of FIG. 3) is also arranged as an audio output section at a given position of the cellular phone 1 in addition to the receiver 25.

Figure 2B:
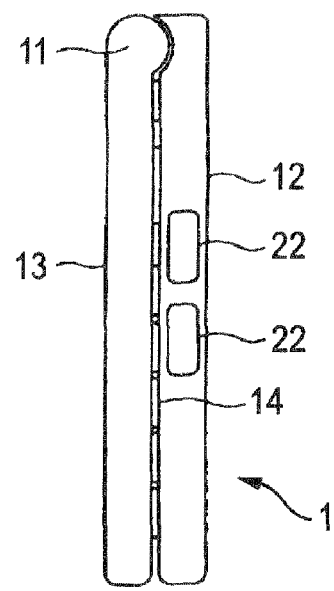

The cellular phone 1 of FIGS. 2A and 2B constitutes a closed state in which the rotation is made in an arrow X direction from the state of the cellular phone 1 of FIGS. 1A and 1B. FIG. 2A shows an external configuration viewed from the front side when the cellular phone 1 is in the closed state, and FIG. 2B shows an external configuration viewed from the side when the cellular phone 1 is in the closed state.

For example, a sub display 28 having an LCD is arranged on the second housing 13. Antenna pictograms indicating sensitivity levels of antennas of the mobile communication network and the wireless LAN communication network at present, a battery pictogram indicating the currently remaining battery level of the cellular phone 1, and a present time are displayed on the sub display 28.

Figure 3:
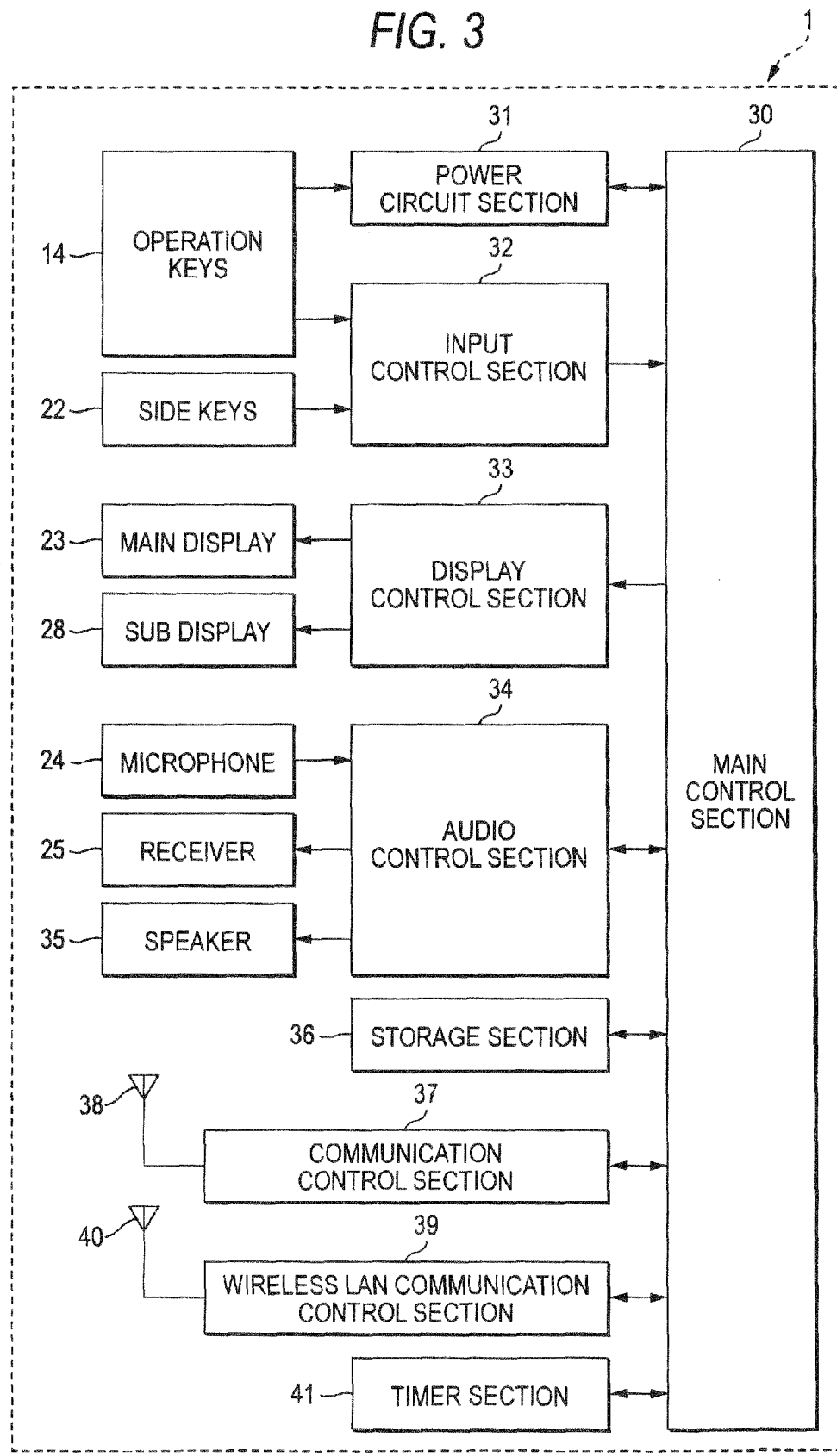
FIG. 3 is a schematic functional block diagram showing a main functional configuration of a cellular phone according to the embodiment.

FIG. 3 is a schematic functional block diagram showing a main functional configuration of the cellular phone 1 according to the embodiment. The cellular phone 1 is constituted in which a main control section 30, a power circuit section 31, an input control section 32, a display control section 33, an audio control section 34, a storage section 36, a communication control section 37, a wireless LAN communication control section 39, and a timer section 41 are connected to be communicable with each other by a bus.

The main control section 30 having a Central Processing Unit (CPU) operates based on various programs stored in the storage section 36, and performs the overall control of the cellular phone 1. The power circuit section 31 has an input interface for the power key 19. When sensing that the user has pressed the power key 19, the power circuit section 31 generates a signal indicating the sensing and transmits the generated signal to the main control section 30. The power circuit section 31 has a power supply (battery). A power ON/OFF state of the cellular phone 1 is switched based on an input via the power key 19. In the power ON state, the power circuit section 31 enables the cellular phone 1 to operate by supplying power from the power supply to each section.

The input control section 32 has an input interface for the operation keys 14 and the side keys 22. When it is sensed that one of the operation keys 14 and the side keys 22 is pressed, the input control section 32 generates a signal indicating the pressed key and transmits the generated signal to the main control section 30. The display control section 33 has a display interface for the main display 23 and the sub display 28. The display control section 33 displays document data, image data, or the like on the main display 23 and the sub display 28 based on control of the main control section 30. The display control section 33 validly or invalidly makes display directed to the main display 23 and the sub display 28 based on control of the main control section 30.

Based on control of the main control section 30, the audio control section 34 generates an analog audio signal from the audio collected by the microphone 24 and converts the analog audio signal into a digital audio signal. When a digital audio signal is acquired, the audio control section 34 converts the digital audio signal into an analog audio signal based on control of the main control section 30 and outputs the audio from the receiver 25.

The storage section 36 includes a Read Only Memory (ROM) which stores a processing program or data necessary for processing in a process to be executed by the main control section 30, a hard disk, a non-volatile memory, a database, a Random Access Memory (RAM) which temporarily stores data to be used while the main control section 30 executes the process.

Based on control of the main control section 30, the communication control section 37 recovers data by executing, a spectrum despreading process for a received signal received from the base station via the antenna 38. The data is transmitted to the audio control section 34 by an instruction of the main control section 30 and is output from the receiver 25 or the speaker 35. Alternatively, the data is transmitted to the display control section 33 and displayed on the main display 23. Alternatively, the data is stored in the storage section 36. When audio data collected by the microphone 24, data input via the operation keys 14, or data stored in the storage section 36 is acquired, the communication control section 37 executes a spectrum spreading process for the data based on control of the main control section 30, and transmits the data to the base station via the antenna 38.

The communication control section 37 includes a wireless communication device based on a communication system (for example, Code Division Multiple Access (CDMA) or Global System for Mobile Communications (GSM)) using the mobile communication network of the cellular phone 1 different from the communication system using the wireless LAN to be implemented by the wireless LAN communication control section 39. The cellular phone 1 performs communication using the mobile communication network (hereinafter, referred to as mobile communication) by the communication control section 37. In the embodiment, the communication control section 37 functions as a second communication module which performs data communication in a second wireless communication system via the base station.

For example, the wireless LAN communication control section 39 includes a wireless communication device based on a wireless LAN standard (for example, IEEE 802.11). The wireless LAN communication control section 39 searches for an access point (AP) and performs data communication (hereinafter, referred to as wireless LAN communication) by establishing a connection to the searched AP via the wireless LAN antenna 40. In the embodiment, the wireless LAN communication control section 39 functions as a first communication module which performs data communication in a first wireless communication system (wireless LAN communication system).

The timer section 41 executes a timer process which reports the passage of a given time based on an instruction of the main control section 30. When a timer start instruction is received from the main control section 30, the timer section 41 starts to measure a given time (timer time) based on the timer start instruction, and transmits a timer expiration notification to the main control section 30 when the given time has elapsed.

In the embodiment, the cellular phone 1 has the communication control section 37 and the wireless LAN communication control section 39, thereby implementing a data communication function using the mobile communication network and the wireless LAN communication network.

The cellular phone 1 performs data communication by preferentially employing one communication system for use in the data communication. When communication is temporarily generated out of range, the cellular phone 1 performs the data communication by automatically switching to another communication system.

In the embodiment, the cellular phone 1 is constituted to execute a process of switching from the preferentially used communication system to the other communication system after surely notifying the user of the fact that the switching is performed. Thus, it is possible to avoid a disadvantage for an automatic operation in a state in which the process of switching from the preferentially used communication system to the other communication system is not reported to the user. Hereinafter, a process to be executed by the cellular phone 1 in the embodiment at the time of automatically switching from the preferentially used communication system to the other communication system will be specifically described.

Figure 4:
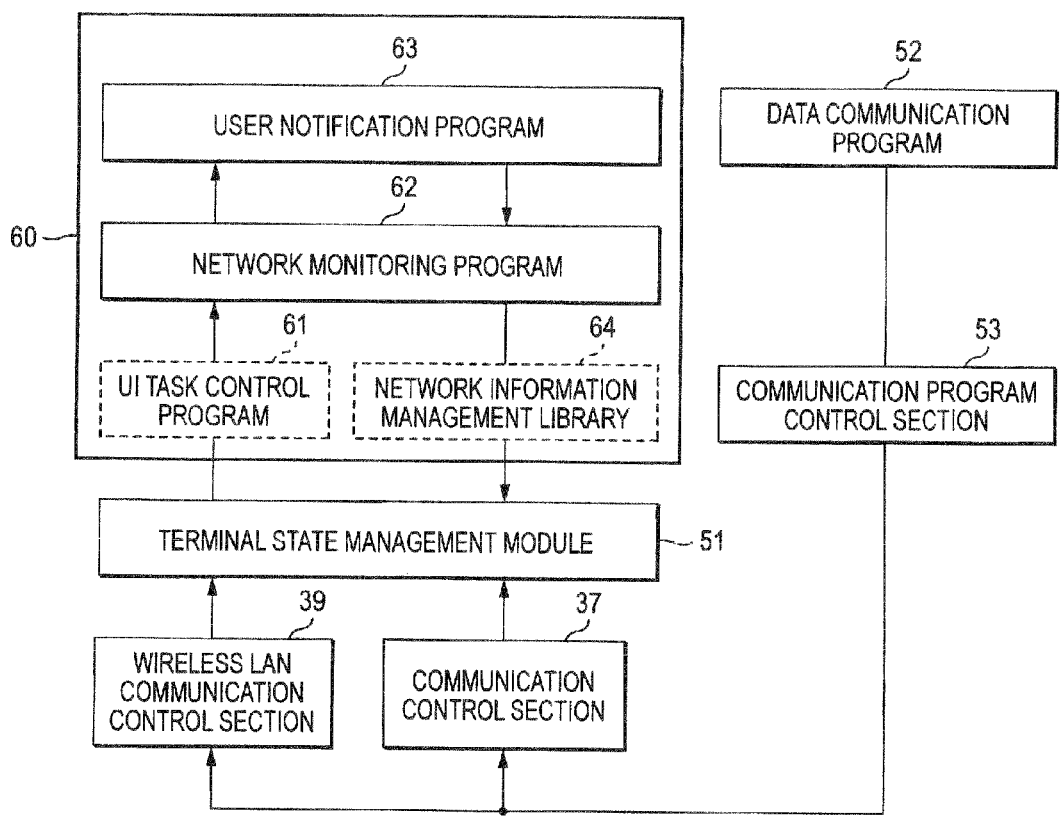
FIG. 4 is a functional block diagram showing a functional configuration implemented by a main control section of the cellular phone according to the embodiment.

FIG. 4 is a functional block diagram showing a functional configuration to be implemented by the main control section 30 of the cellular phone 1 according to the embodiment.

A terminal state management module 51 has a function of aging a state of the cellular phone 1. When the state is changed, each section of the cellular phone 1 notifies the terminal state management module 51 of the changed state. The terminal state management module 51 allows each section of the cellular phone 1 to refer to managed information as necessary, executes a process registered to the terminal state management module 51, or sends a notification to each section as necessary. In the embodiment, the terminal state management module 51 functions as a state management module for managing a communication state of the wireless LAN communication control section 39 and sending an out-of-range notification to a network monitoring program 62 when the wireless LAN communication moves out of range from a state in which both the mobile communication and the wireless LAN communication are within range. Further, the terminal state management module 51 functions as a communication prohibition module for prohibiting data communication by mobile communication even when the mobile communication is within range until setting indicating that a process has been completed is performed by a setting module after the communication state is changed from a state in which both the mobile communication and the wireless LAN communication are within range to a state in which the communication state of the wireless LAN communication moves out of range.

A data communication program 52 is a program which performs data communication and, for example, is a browser. When a communication request is received from the data communication program 52, a communication program control section 53 checks a present wireless state with the communication control section 37 and the wireless LAN communication control section 39. The communication program control section 53 determines a priority corresponding to the wireless state, and makes a connection request directed to the communication control section or the wireless LAN communication control section 39. The communication control section 37 and the wireless LAN communication control section 39 perform data communication after sending an inquiry about communication permission/prohibition to the terminal state management module 51 based on an instruction from the communication program control section 53.

A user interface task (UI task) 60 is a program which generates a control signal corresponding to the display to the main display 23 and the sub display 28 or the operation to the operation keys 14 and the side keys 22. A UI task control program 61, the network monitoring program 62, a user notification program 63, and a network information management library 64 are installed to the UI task 60.

The UI task control program 61 controls the execution of each program installed to the UI task 60.

The network monitoring program 62 notifies another program installed to the UI task 60 of a necessary process in response to a communication state of each of the communication control sections 37 and 39 managed by the terminal state management module 51. In the embodiment, the network monitoring program 62 makes a user notification along with the user notification program 63 when the out-of-range notification is received from the terminal state management module 51. When it is determined that a given process for the user notification is completed by the user notification program 63, the network monitoring program 62 performs setting indicating that the process for the user notification is completed to the terminal state management module 51.

Based on an instruction of the network monitoring program 62, the user notification program 63 outputs a user notification as a notification indicating that the wireless LAN communication is disconnected to the user. For example, the user notification program 63 outputs the user notification by making the display to the main display 23 or outputting the audio from the speaker 35. Further, the user notification program 63 receives a response via the operation keys 14 with respect to the output user notification. The user notification program 63 determines whether or not a given process is completed for the above-described notification module in the embodiment and the user notification.

The network information management library 64 has an interface function for each program installed to the UI task 60. In the embodiment, the network information management library 64 particularly has a function as an interface of the network monitoring program 62 and the terminal state management module 51.

Next, a processing flow when the cellular phone 1 according to the embodiment is switched from a preferentially used communication system to another communication system will be described using FIG. 5.

Figure 5:
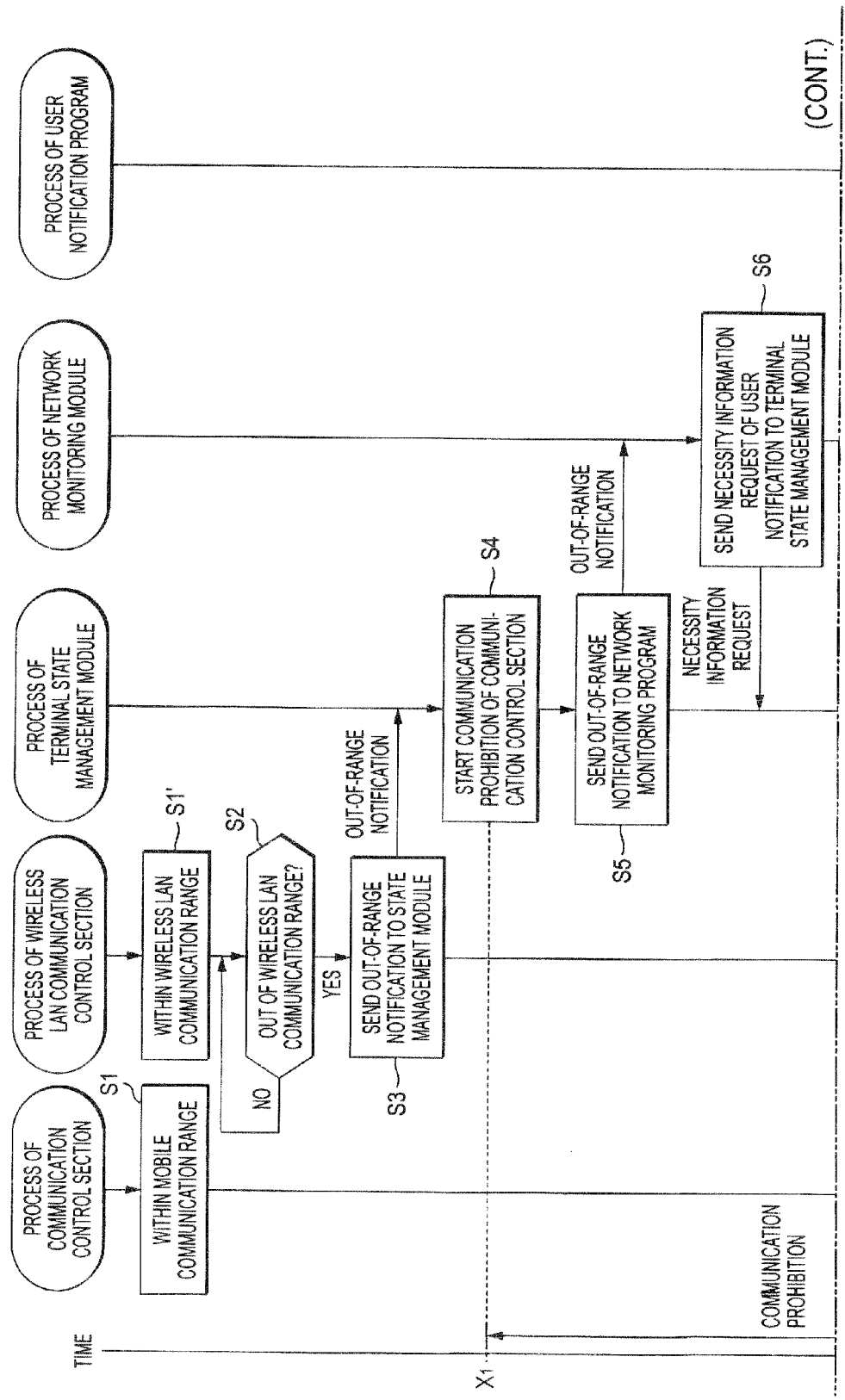
FIG. 5 is a flowchart showing a communication switching process executed by the cellular phone according to the embodiment.

FIG. 5 is a flowchart showing a communication switching process executed by the cellular phone 1 according to the embodiment. The communication switching process will be described as a process in the case where the wireless LAN communication is out of range when data communication using the wireless LAN communication is performed by the wireless LAN communication control section 39 within a communication range where both the mobile communication to be executed by the communication control section 37 and the wireless LAN communication to be executed by the wireless LAN communication control section 39 exist.

In steps S1', and both the mobile communication to be executed by the communication control section 37 and the wireless LAN communication to be executed by the wireless LAN communication control section 39 are within the communication range.

In step S2, the wireless LAN communication control section 39 determines whether or not the wireless LAN communication has moved from the inside of the communication range to the outside of the communication range. When it is determined that the wireless LAN communication is within the communication range, the wireless LAN communication control section 39 continues data communication currently being performed.

On the other hand, when it is determined that the wireless LAN communication has moved out of the communication range, the wireless LAN communication control section 39 notifies the terminal state management module 51 of the fact that the wireless LAN communication has moved out of the communication range in step S3.

In step S4, the terminal state management module 51 starts the prohibition of data communication by the communication control section with the wireless LAN communication moving out of the communication range (time $x_1$).

As described above, the communication control section 37 performs data communication by receiving a connection request front the communication program control section 53. Here, when the data communication connection request is received from the communication program control section 53, the communication control section 37 sends an inquiry about communication permission/prohibition to the terminal state management module 51. The terminal state management module 51 returns a communication permission or prohibition notification to the inquiry about the communication permission/prohibition. The terminal state management module 51 prohibits the data communication by the communication control section 37 by returning the communication prohibition notification to the inquiry about the communication permission/prohibition received from the communication control section 37. Details of a process when the data communication by the communication control section 37 including a process between the communication program control section 53 and the communication control section 37 (and the wireless LAN communication control section 39) is prohibited will be described later using FIG. 8.

In step S5, the terminal state management module 51 sends an out-of-range communication notification to the network monitoring program 62. In step S6, the network monitoring program 62 sends a user notification necessity information request to the terminal state management module 51.

Here, when the wireless LAN communication by the wireless LAN communication control section 39 has moved out of the communication range, two cases are included. In the first case where the wireless LAN communication moves out of the communication range, the wireless LAN communication control section 39 is out of the communication range with a disconnection from a communicable AP. This is referred to as "true out-of-range communication".

Since data communication limited to the mobile communication by the communication control section 37 is performed in the second case where the wireless LAN communication moves out of the communication range, this is the case where the wireless LAN communication has been forcibly moved out of the communication range, and is referred to as "apparent out-of-range communication". For example, the case of moving to "apparent out-of-range communication" is the case where data communication limited to the mobile communication has been performed such as the case where the cellular phone 1 has received a data communication instruction for using Short Message Service (SMS).

When the wireless LAN communication has moved out of the communication range, the terminal state management module 51 manages information regarding the move to "true out-of-range communication" or "apparent out-of-range communication".

In step S7, the terminal state management module 51 reports the user notification necessity information to the request of the network monitoring program 62 in response to whether the wireless LAN communication is "true out-of-range communication" or "apparent out-of-range communication".

When the wireless LAN communication is "true out-of-range communication", the terminal state management module 51 makes a notification indicating that the user notification is necessary. On the other hand, when the wireless LAN communication is "apparent out-of-range communication", the terminal state management module 51 makes a notification indicating that the user notification is unnecessary. Since the case of "apparent out-of-range communication" is the case where data communication by the mobile communication is performed with a user operation, it is unnecessary to notify the user of the switching from the wireless LAN communication to the mobile communication.

In step S8, the network monitoring program 62 determines whether or not the user notification is necessary based on the necessity information received from the terminal state management module 51. When it is determined that the user notification is unnecessary, the network monitoring program 62 ends the communication switching process. When the communication switching process is ended since it is determined that the user notification is unnecessary, the data communication by the above-described mobile communication is ended. When the wireless LAN communication moves from "apparent out-of-range communication" to communication within range, it returns to the out-of-range communication determination step S2 and a subsequent process is repeated.

In step S9, the network monitoring program 62 notifies the user notification program 63 of a user notification start instruction.

In step S10, the user notification program 63 outputs the user notification (time $x_2$). The user notification output by the user notification program 63 is a notification indicating that the wireless LAN communication has been disconnected. The user notification is not limited to the notification indicating that the wireless LAN communication has been disconnected, and may be a notification indicating the switching from the wireless LAN communication to the mobile communication.

Figure 6:
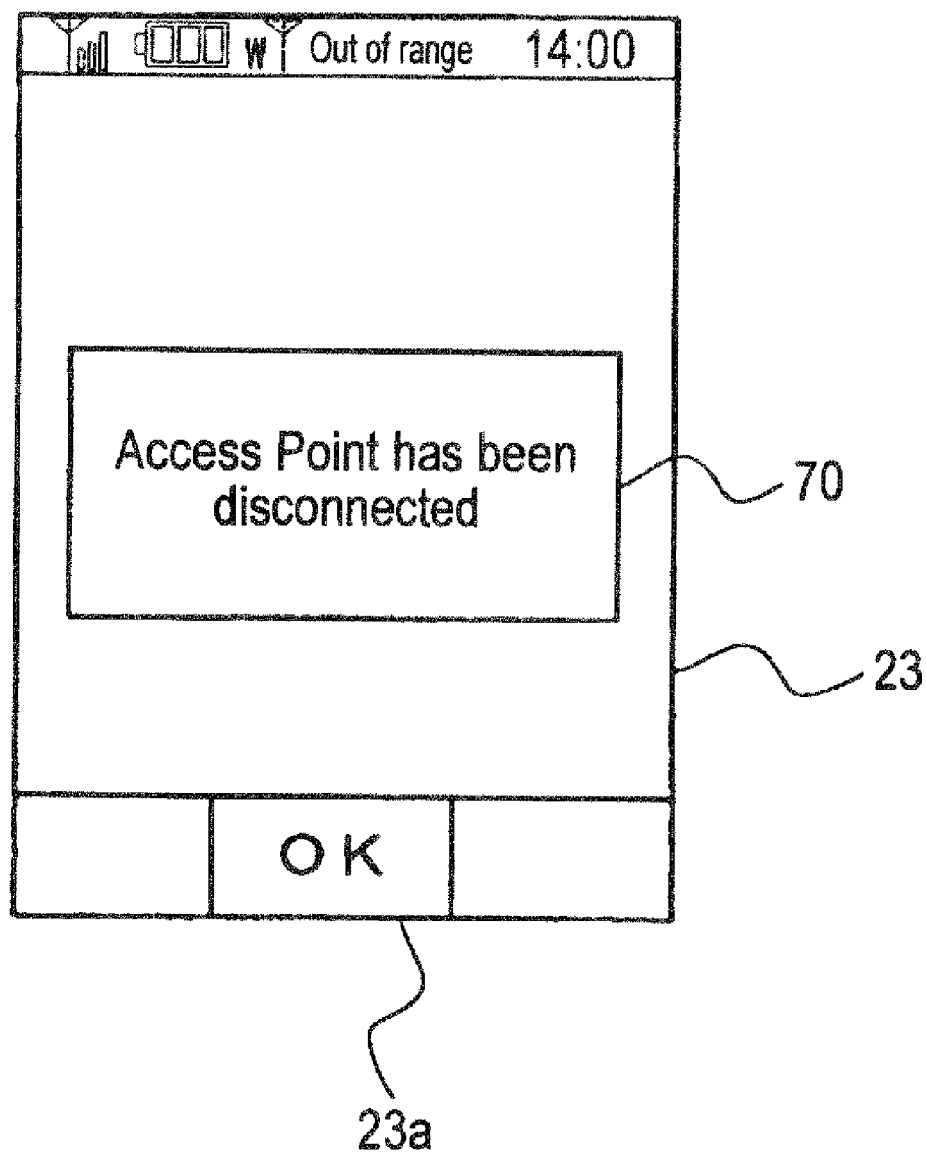
FIG. 6 is a diagram showing an example of a user notification output by a user notification program.

FIG. 6 shows an example of a user notification output by the user notification program 63. As shown in FIG. 6, for example, the user notification program 63 causes the main display 23 to display a pop-up 70 indicating "Access point has been disconnected". The word "OK" indicating a response to the user notification is displayed on the enter key function display section 23a, and the user is prompted to press the enter key 17.

The user notification program 63 sends the user notification in accordance with the pop-up by outputting audio data from the speaker 35, generating vibration by a vibrator (not shown), or emitting light by a Light Emitting Diode (LED) (not shown) simultaneously with the pop-up 70.

In step S11, the user notification program 63 determines whether or not a necessary process has been completed. The necessary process is a process of receiving a response to the user notification displayed on the main display 23 from the user or a process of detecting that a given time (for example, 5 sec) has elapsed (T. O.) after the user notification. For example, the process of receiving the response to the user notification from the user is a process of receiving an input of the enter key 17. The passage of the given time is detected as the timer section 41 starts to measure the given time and the user notification program 63 receives a timer expiration notification after the passage of the given time. When it is determined that the process is not yet completed, the user notification program 63 waits for the process to be completed.

On the other hand, when it is determined that the process has been completed (time $x_3$), the user notification program 63 notifies the network monitoring program 62 of the user notification end in step S12.

In step S13, the network monitoring program 62 performs setting indicating that the process for the user notification has been completed to the terminal state management module 51 with the notification received from the user notification program 63.

In step S14, the terminal state management module 51 ends the prohibition of data communication by the communication control section 37 which has been started in the communication prohibition step S4 (time $x_4$). Accordingly, when the inquiry about the communication permission/prohibition has been received from the communication control section 37, the terminal state management module 51 permits data communication by the communication control section 37 by returning the communication permission notification.

Figure 7:
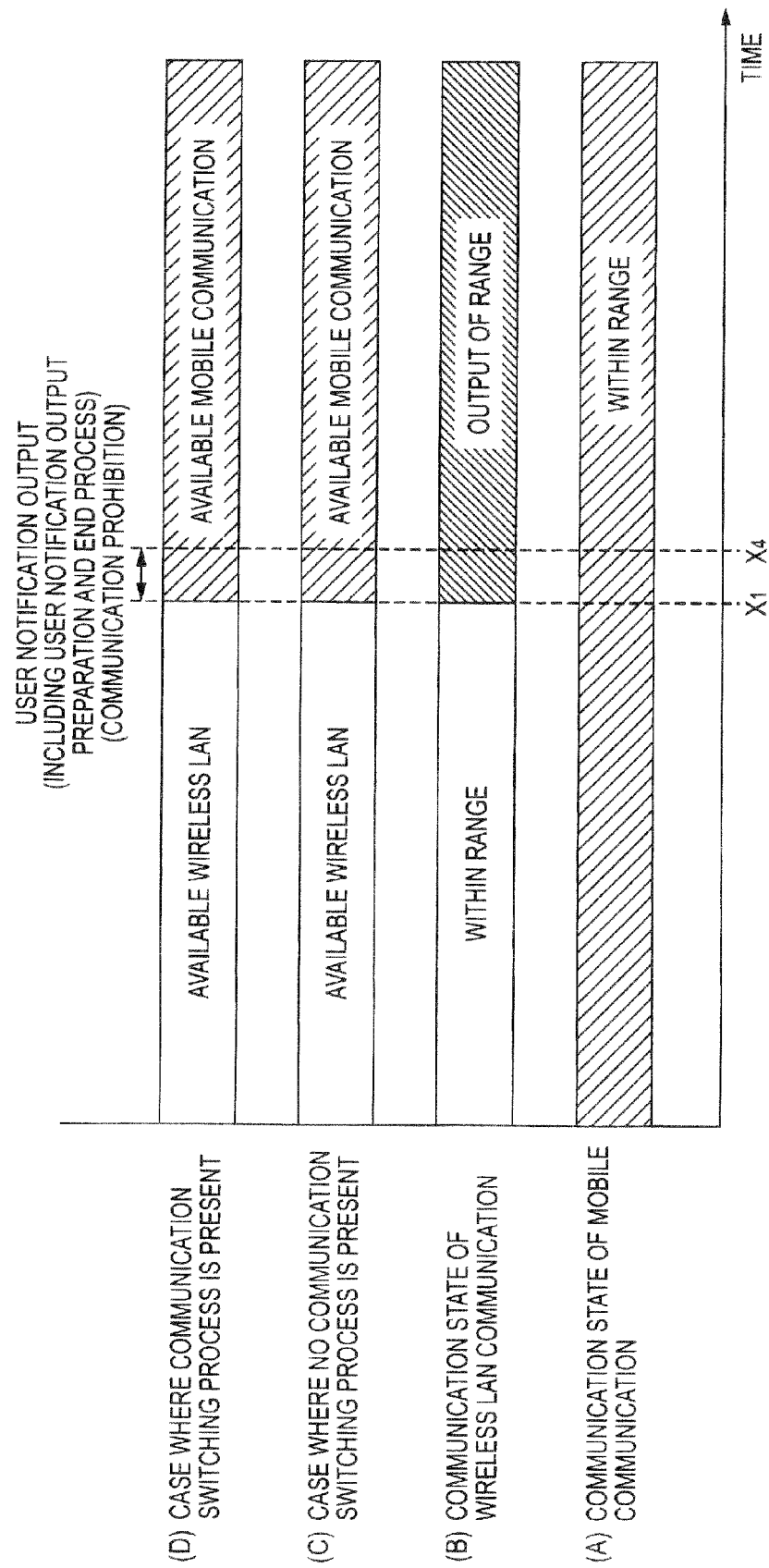
FIG. 7 is a diagram showing a communication state when the communication switching process to be executed by the cellular phone is performed according to the embodiment.

(A) of FIG. 7 shows an example of a communication state of mobile communication performed by the communication control section 37. (B) of FIG. 7 shows an example of a communication state of wireless LAN communication performed by the wireless LAN communication control section 39. (C) of FIG. 7 shows an available communication system viewed from the user when the communication states of (A) and (B) of FIG. 7 are generated in the case where no communication switching process is executed in the embodiment. (D) of FIG. 7 shows an available communication system viewed from the user when the communication states of (A) and (B) of FIG. 7 are generated in the case where the communication switching process is executed in the embodiment.

It is described that times $x_1$ to $x_2$ are the duration of a user notification output preparation process, times $x_2$ to $x_3$ are the duration of a user notification output, and times $x_3$ to $x_4$ are the duration of a user notification end process.

When the communication state of the mobile communication is within range (step S1 of FIG. 5) as shown in (A) of FIG. 7 and the communication state of the wireless LAN communication is within the communication range (step S1') as shown in (B) of FIG. 7, data communication to be performed by the cellular phone 1 is in a state in which the data communication is available using the wireless LAN communication as a preferentially used communication system as shown in (C) and (D) of FIG. 7 since the two are within the communication range.

When the wireless LAN communication is out of the communication range (YES of step S2), the cellular phone 1 is switched to the mobile communication in the case where next data communication has been requested. When the wireless LAN communication out of the communication range while the data communication is performed by the wireless LAN communication network, the data communication is only stopped as an error without automatically switching to the mobile communication.

In the case where the communication switching process described in the embodiment is not executed, it moves to a state in which the data communication using the mobile communication is available substantially simultaneously after the wireless LAN communication is out of the communication range and therefore is not available as shown in (C) of FIG. 7. That is, data communication is performed by the mobile communication when the next data communication is requested after time $x_1$. Thus, a delay may be generated even when the user is notified of the fact that the wireless LAN communication is disconnected and the switching to the mobile communication is made by displaying a pop-up or the like. There is a possibility that data communication may be started by the mobile communication in a state in which the switching of the communication system is not reported to the user. For example, a delay may also be generated until the pop-up or the like is displayed after the disconnection of the wireless LAN communication due to the effect of a task switch or the like.

That is, when a data communication request is received in times $x_1$ to $x_4$, the data communication by the mobile communication is started. In particular, when the data communication request is received during times $x_1$ to and the data communication by the mobile communication is performed, the data communication by the mobile communication is performed before the user is notified of the fact that the wireless LAN communication is out of the communication range (without notifying the user thereof). As a result, an unintended high data communication cost is charged to the user.

It is not possible to receive the data communication request from the user since the pop-up 70 as shown in FIG. 6 is displayed during times $x_2$ to $x_4$. However, during times $x_2$ to $x_4$, there is a possibility that the communication control section 37 may receive a user-operated data communication request before time $x_2$.

On the other hand, when the communication switching process described in the embodiment is executed, the cellular phone 1 prohibits the data communication by the communication control section 37 based on the notification received by the terminal state management module 51 from the wireless LAN communication control section 39 after the wireless LAN communication is not available out of the communication range (after time $x_1$) (step S4) as shown in (D) of FIG. 7. Thereafter, the cellular phone 1 sends the user notification using the pop-up 70 by the user notification program 63 (step S10). The communication by the mobile communication is prohibited by the terminal state management module 51 until the user accepts a response to the pop-up 70 or a given time in which the user checks the pop-up is passed (until time $x_4$) (step S14).

That is, the communication state of the mobile communication is actually within the communication range as shown in (A) of FIG. 7, but the terminal state management module 51 of the cellular phone 1 forcibly prohibits the communication by the mobile communication in the duration of the user notification output by the pop-up 70 or the like, the duration of the output preparation process, and the duration of the output end process (times $x_1$ to $x_4$) as shown in (D) of FIG. 7. Thus, the cellular phone 1 can surely notify the user thereof before the switching to the mobile communication when the switching from the wireless LAN communication to the mobile communication is made with the wireless LAN communication moving out of the communication range, and can prevent data communication by the mobile communication from being performed in a state in which the user does not make the recognition thereof.

Here, for example, a process to be executed by the cellular phone 1 when a browser communication request is accepted by the user will be described. The process at the communication request time includes a process to be executed among the communication program control section 53, the communication control section 37, and the wireless LAN communication control section 39 and corresponds to the process when data communication by the communication control section 37 is prohibited.

Figure 8:
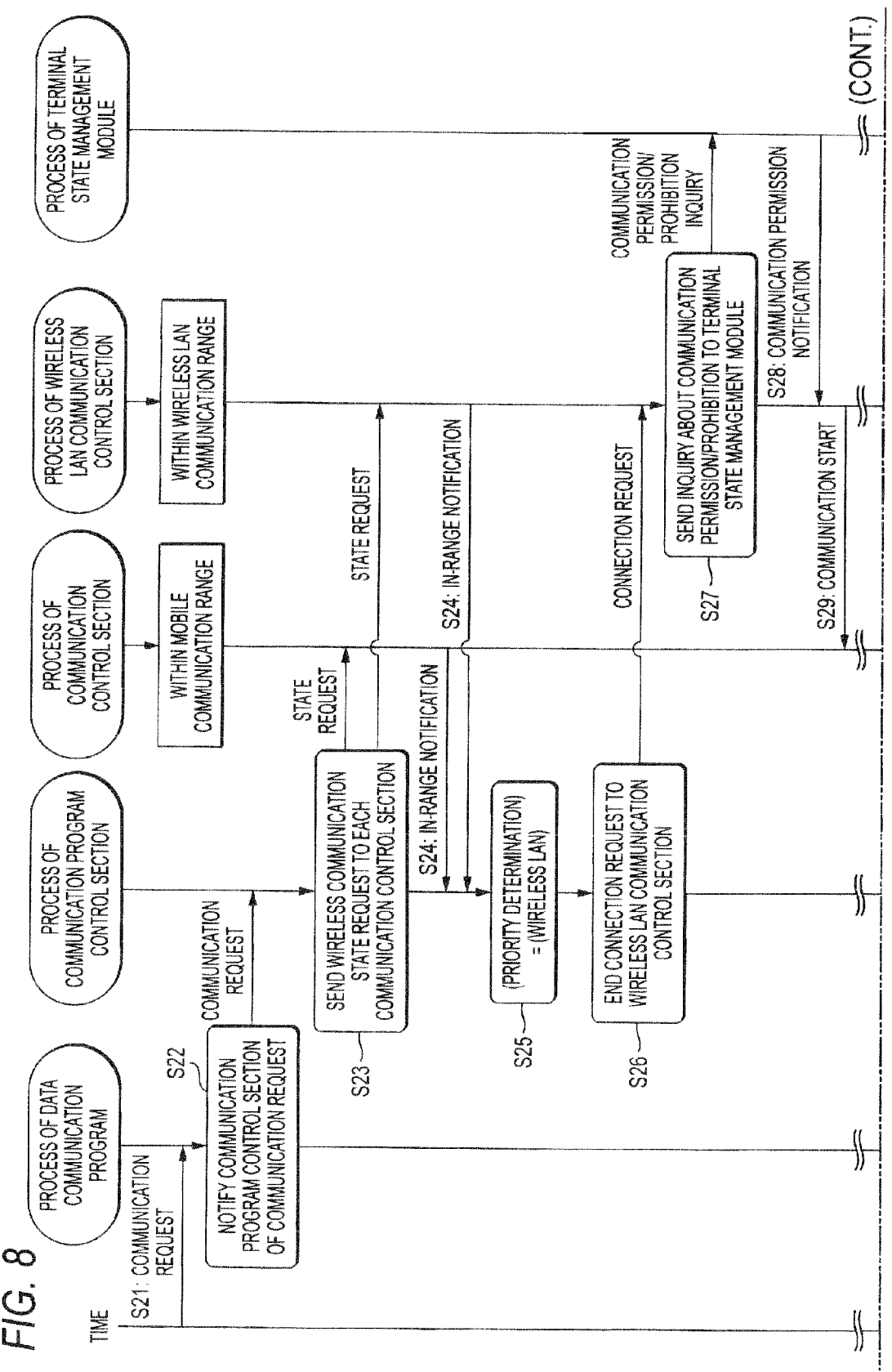
FIG. 8 is a flowchart showing a process at the time of a communication request executed by the cellular phone according to the embodiment.

FIG. 8 is a flowchart showing a process to be executed by the cellular phone 1 according to the embodiment at the communication request time. The process at the communication request time to be described in the following operates in parallel with the communication switching process of FIG. 5, but only some steps are shown in FIG. 8 so that the outline of the process at the communication request time is understood and also the operations of the network monitoring program 62 and the data communication program 63 are omitted.

First, the operation in the case where an operation associated with the data communication by the user is received (a communication request has been received) when both the mobile communication and the wireless LAN communication are within the communication range (before time $x_1$ of FIG. 5 and before step S4) will be described.

When the operation associated with the data communication is received from the user in step S21, the data communication program 52 notifies the communication program control section 53 of the communication request in step S22.

In step S23, the communication program control section 53 makes a request of a current wireless state (communication within range or out-of-range communication) to the communication control section 37 and the wireless LAN communication control section 39. In the step S24, the communication control section 37 and the wireless LAN communication control section 39 notify the communication program control section 53 of information regarding a situation of the current wireless state (communication within range or out-of-range communication). Here, since each of the wireless states of the mobile communication and the wireless LAN communication is within the communication range, the communication program control section 53 is notified of the fact that each is within the communication range.

In step S25, the communication program control section 53 determines which communication network performs data communication based on information regarding the wireless states reported from the communication control section 37 and the wireless LAN communication control section 39. Here, since both the mobile communication and the wireless LAN communication are within the communication range, it is determined that data communication is to be performed by the wireless LAN communication as a communication system to be preferentially used.

In step S26, the communication program control section 53 sends a connection request to the wireless LAN communication control section 39.

In step S27, the wireless LAN communication control section 39 sends an inquiry about whether the cellular phone 1 is in a communicable situation to the terminal state management module 51, which manages the overall control of the cellular phone 1, with the reception of the connection request from the communication program control section 53. In step S28, the terminal state management module 51 notifies the wireless LAN communication control section 39 of communication permission or prohibition. Here, since it is not in the data communication prohibition state, the terminal state management module 51 reports the communication permission.

In step S29, the wireless LAN communication control section 39 makes a connection to an AP (not shown) and starts data communication. The description of the operation when both the wireless LAN communication network and the mobile communication network are within the communication range is ended.

Next, the operation in the case where an operation associated with data communication by the user is received (a communication request is received) when the wireless LAN communication is changed from communication within range to out-of-range communication and the mobile communication is communication within range (after times $x_1$ to $x_4$ of FIG. 5 and step S4) will be described. The operation redundant with each step before time $x_1$ is denoted by the same step numeral, and description thereof is omitted.

With a request of a current wireless state (communication within range or out-of-range communication) by the communication program control section 53 to the communication control section 37 and the wireless LAN communication control section 39 (step S23), the communication control section 37 and the wireless LAN communication control section 39 notify the communication program control section 53 of information regarding a situation of the current wireless state (communication within range or out-of-range communication) in step S34. Here, the communication control section 37 and the wireless LAN communication control section 39 notify the communication program control section 53 of the fact that the mobile communication is within the communication range and the wireless LAN communication is out of the communication range.

In step S35, the communication program control section 53 determines which communication network performs communication based on information regarding the wireless states reported from the communication control section 37 and the wireless LAN communication control section 39. Here, since the wireless LAN communication is out of the communication range and the mobile communication is within the communication range, it is determined that communication is to be performed by the mobile communication network.

In step S36, the communication program control section 53 sends a connection request to the communication control section 37.

In step S37, the communication control section 37 sends an inquiry about whether the cellular phone 1 is in a communicable situation to the terminal state management module 51, which manages the overall control of the cellular phone 1, with the reception of the connection request from the communication program control section 53. In step S38, the terminal state management module 51 notifies the communication control section 37 of communication permission or prohibition. Here, since it is in the data communication prohibition state in step S4 of FIG. 5, the communication permission is reported from the terminal state management module 51 to the communication control section 37.

The communication control section 37 sends a notification indicating a communication error to the data communication program 52 via the communication program control section 53 (steps S39 and S40). The description of the operation when the wireless LAN communication is out of the communication range and the mobile communication is within the communication range is ended.

In the case where the communication switching process described in the embodiment is not executed, a process of prohibiting communication of steps S4 to S14 (times $x_1$ to $x_4$) is not executed. Thus, in step S38, a communication permission notification is sent from the terminal state management module 51, and the communication control section 37 starts data communication in the mobile communication network. Therefore, the data communication by the mobile communication is performed before the user is notified of the fact that the wireless LAN communication is out of the communication range (without notifying the user thereof). As a result, an unintended high data communication cost is charged.

The communication switching process described in the embodiment is a process of forcibly prohibiting data communication using mobile communication. Thus, even when one or more communication systems capable of performing data communication within the communication range exist, the cellular phone 1 can forcibly make a non-communicable state. As a result, there is a possibility that a system error may be generated in each section of the cellular phone 1.

Here, for example, there is considered the case where the cellular phone 1 in the embodiment is a cellular phone having a configuration in which data communication is prevented when a data communication program operates in the background.

While communication by the mobile communication is prohibited in the cellular phone 1, the user notification program 63 which makes a user notification such as the pop-up 70 exists as a program which operates in the foreground. Thus, since a program which performs data communication is handled as a program which operates in the background by the presence of the user notification program 63, it is considered that the execution of the primary data communication is prevented. As a result, in particular, no error is generated even when the cellular phone 1 has executed the communication switching process described in the embodiment.

While the cellular phone 1 prohibits data communication by the mobile communication, there is also a possibility that an error in which data communication is incapable of being performed even by the user may be generated.

For example, it is possible for the user to input a data communication instruction using the operation keys 14 or the like immediately before the wireless LAN communication moves from communication within range to out-of-range communication (for example, immediately before the out-of-range notification step S3 of FIG. 5). At this time, it is considered that the user has input an execution instruction by expecting the data communication to be performed by the wireless LAN communication.

However, when the wireless LAN communication is switched to the mobile communication after the move out of the communication range, regardless of the execution of the communication switching process in the embodiment, the step in which data communication by the mobile communication is re-established is to be performed once the wireless LAN communication fails. Thus, the user is not inconvenienced even when a time of forcibly prohibiting communication even for a data communication execution instruction of the user is set as in the cellular phone 1 according to the embodiment.

For example, there is considered the case where the user has input a data communication instruction using the operation keys 14 or the like substantially simultaneously when the wireless LAN communication has moved from communication within range to out-of-range communication (for example, substantially simultaneously with the out-of-range notification step S3 of FIG. 5). In this case, even when the user has input the data communication instruction, the user notification program 63 exists as a program which operates in the foreground immediately after the input or simultaneously with the input. Thus, when a program which performs the data communication operates in the background as described above, it is considered that the execution of data communication is prevented. A disadvantage for the user associated with the display of the pop-up 70 and the forcible prohibition of data communication does not occur.

Since the communication switching process according to the embodiment is limited only to data communication, it does not affect communication using a circuit-switched system. Thus, it is possible to receive an incoming audio signal even while the pop-up 70 is displayed.

When the cellular phone 1 receives an instruction to perform data communication after the communication prohibition end step S14 of the communication switching process of FIG. 5, the data communication is performed using the mobile communication different from the wireless LAN communication to be preferentially used while the wireless LAN communication is out of the communication range.

Even when the wireless LAN communication moves to the communication range while data communication is performed using the mobile communication, the cellular phone 1 continues the data communication using the mobile communication. When the data communication using the mobile communication is ended, the cellular phone 1 re-switches a communication system preferentially used for data communication to the wireless LAN communication and repeats a process after the out-of-range determination step S2. That is, when the mobile communication network is within the communication range and the wireless LAN communication network moves from the outside of the communication range to the inside of the communication range, a process after the out-of-range determination step S2 is executed without executing the prohibition process after the communication prohibition start step S4 of FIG. 5. This case is because the communication of an unintended high-cost billing system is not performed.

As described above, the cellular phone 1 prohibits data communication by another communication system until the user recognizes the switching of the communication system (until it is determined that the user has recognized the switching) even when the switching of the communication system is generated. Thus, the cellular phone 1 can appropriately control the switching of the communication system without generating data communication unintended by the user.

When the start of the pop-up display process and the switching of the communication system associated with the out-of-range communication is substantially simultaneously performed ((C) of FIG. 7), there is a possibility that the display of the pop-up 70 may be delayed and data communication by the mobile communication may be started in a state in which the switching is not reported to the user. On the other hand, the cellular phone 1 according to the embodiment can respond to the above-described problems by prohibiting the data communication until the user recognizes the user notification such as the pop-up 70, (until it is determined that the user has recognized the user notification).

Even when the billing system is different between communication systems, the cellular phone 1 can appropriately prevent an unintended data communication cost from being added by continuous data communication in a state in which the user does not recognize the switching of the communication system.

For example, when a communication system to be preferentially used is set to low-cost wireless LAN communication, the automatic switching to high-cost mobile communication may occur with communication temporarily generated out of range or the like. Even in this case, the cellular phone 1 can surely make a user notification by the pop-up 70 or the like and can prohibit unintended data communication until the user notification is identified. The user can determine the end of data communication so as to avoid the use of high-cost mobile communication by identifying the pop-up 70 or the like.

In the embodiment, for example, the cellular phone 1 capable of performing data communication using two types of systems as the mobile communication system such as CDMA and the wireless LAN communication system has been described, but the communication system is not limited to the two types and is also applicable to communication systems whose number is greater than 2.

The present invention is applicable to a Personal Digital Assistant (PDA), a personal computer, a portable gaming machine, a portable music player, a portable video player, and other mobile terminals having a plurality of communication systems to be used for data communication as well as the cellular phone 1.

The series of processes described in the embodiment of the present invention may be executed by hardware or software.

In the embodiment of the present invention, the steps of the flowchart have been shown as an example of the process to be executed chronologically according to the sequence noted on the flowchart. They also include a process to be executed in parallel or individually as well as the process to be chronologically executed.

What is claimed is:

1. A mobile terminal including:
a first communication module which performs data communication in a first wireless communication system;
a second communication module which performs data communication with a base station in a second wireless communication system; and
a processing unit comprising a non-transitory computer readable medium, the processing unit comprising:
a state management means for managing a communication state of the first communication means and making an out-of-range notification as a notification indicating that the first communication means moves out of a communication range when communication by the first communication means moves out of the communication range from a state in which both of the first communication means and the second communication means are within the communication range;
a notification means for sending a user notification as a notification indicating that the first communication means is disconnected to a user when the out-of-range notification is received by the state management means;
a determination means for determining whether or not a given process for the user notification is completed;
a setting means for performing setting indicating that the process for the user notification is completed to the state management means when the determination means determines that the process is completed; and
a communication prohibition means for prohibiting the data communication by the second communication means even when communication by the second communication means is within the communication range until the setting indicating that the process is completed is performed by the setting means after the communication state managed by the state management means is changed from a state in which both of the first communication means and the second communication means are within the communication range to a state in which a communication state of the first communication means moves out of the communication range.

2. The mobile terminal according to claim 1,
wherein the first wireless communication system is a wireless LAN communication system, and
wherein the second wireless communication system is a CDMA communication system.

3. A mobile terminal including:
a first communication module which performs data communication in a wireless LAN communication system;
a second communication module which performs data communication with a base station in a mobile communication system; and
a processing unit comprising a non-transitory computer readable medium, the processing unit comprising:
a state management means for managing a communication state of the first communication means and making a notification indicating that the first communication means is non-communicable when communication by the first communication means moves to a non-communicable state from a state in which both the first communication means and the second communication means are communicable;
a notification means for sending a user notification as a notification indicating that the first communication means is disconnected to a user when the notification is received by the state management means;
a determination means for determining whether or not a given process for the user notification is completed; and
a setting means for performing setting indicating that the process for the user notification is completed to the state management means when the determination means determines that the process is completed,
wherein the state management means prohibits the data communication by the second communication means even when communication by the second communication means is communicable until the setting indicating that the process is completed is performed by the setting means after the managed communication state is changed from a state in which both of the first communication means and the second communication means are communicable to a state in which a communication state of the first communication means is non-communicable.

4. The mobile terminal according to claim 1,
wherein the process to be executed for the user notification is one of a process of receiving a response to the user notification and a process of detecting that a given time has elapsed after the user notification.

5. The mobile terminal according to claim 2,
wherein the process to be executed for the user notification is one of a process of receiving a response to the user notification and a process of detecting that a given time has elapsed after the user notification.

6. The mobile terminal according to claim 3,
wherein the process to be executed for the user notification is one of a process of receiving a response to the user notification and a process of detecting that a given time has elapsed after the user notification.

7. The mobile terminal according to claim 1,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

8. The mobile terminal according to claim 2,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

9. The mobile terminal according to claim 3,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

10. The mobile terminal according to claim 4,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

11. The mobile terminal according to claim 5,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

12. The mobile terminal according to claim 6,
wherein the case where the first communication means moves out of the communication range includes a case of moving to true out-of-range communication and a case of moving to apparent out-of-range communication, and
wherein the notification means determines whether or not the first communication means moves to the true out-of-range communication in a case of receiving the out-of-range notification by the state management means, and sends the user notification in a case of determining that the first communication means moves to the true out-of-range communication.

* * * * *